(12) United States Patent
Cuypers et al.

(10) Patent No.: US 11,516,974 B2
(45) Date of Patent: Dec. 6, 2022

(54) GROWTH SUBSTRATE PRODUCT FORMED OF MINERAL WOOL

(75) Inventors: Jean Marie Wilhelmus Cuypers, CX Linne (NL); Eelke Gjalt Hempenius, BX Deest (NL)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 0 days.

(21) Appl. No.: 13/703,188

(22) PCT Filed: Jun. 30, 2011

(86) PCT No.: PCT/EP2011/061067
§ 371 (c)(1),
(2), (4) Date: May 30, 2013

(87) PCT Pub. No.: WO2012/001130
PCT Pub. Date: Jan. 5, 2012

(65) Prior Publication Data
US 2013/0263507 A1    Oct. 10, 2013

(30) Foreign Application Priority Data

Jun. 30, 2010   (EP) ..................... 10167986

(51) Int. Cl.
*A01G 24/44*    (2018.01)
*A01G 24/18*    (2018.01)
(Continued)

(52) U.S. Cl.
CPC ............. *A01G 24/18* (2018.02); *A01G 9/029* (2018.02); *A01G 24/42* (2018.02); *A01G 24/44* (2018.02)

(58) Field of Classification Search
CPC .................. A01G 31/001; A01G 2031/005
(Continued)

(56) References Cited

U.S. PATENT DOCUMENTS 3,627,173 A * 12/1971 Kerker .................... A01G 9/085
                                                     221/211
4,004,713 A *  1/1977 Visser .................... A01C 7/042
                                                     221/211

(Continued)

FOREIGN PATENT DOCUMENTS

DK    102550    9/1965
EP    249261    12/1987
(Continued)

OTHER PUBLICATIONS

"How To Plant Turnips" by Veggiegardener, posted at http://www.veggiegardener.com/how-to-plant-turnip-greens/, Jul. 19, 2009.*
(Continued)

*Primary Examiner* — Monica L Perry
(74) *Attorney, Agent, or Firm* — Tarolli, Sundheim, Covell & Tummino LLP (57) ABSTRACT

This invention includes a coherent growth substrate product formed of mineral wool, the product having two opposed top and bottom surfaces and a seed hole extending from the top surface towards the bottom surface, the base of the seed hole defining a seed bed, wherein the volume of the growth substrate product is not more than 150 cm$^3$, and wherein the seed bed has a width of at least 5 mm.

18 Claims, 3 Drawing Sheets

(51) Int. Cl.
*A01G 24/42* (2018.01)
*A01G 9/029* (2018.01)

(58) Field of Classification Search
USPC .................................................. 47/59 R–61
See application file for complete search history.

(56) References Cited

U.S. PATENT DOCUMENTS

| | | | | |
|---|---|---|---|---|
| 4,251,011 A * | 2/1981 | Hamilton | ............... | A01G 9/085 |
| | | | | 221/204 |
| 4,627,190 A * | 12/1986 | Little | ............... | A01G 9/085 |
| | | | | 221/211 |
| 4,777,763 A * | 10/1988 | Shannon | ............... | A01G 31/001 |
| | | | | 47/64 |
| 4,949,503 A * | 8/1990 | Blok | ............... | D04H 1/4209 |
| | | | | 47/64 |
| 5,009,031 A * | 4/1991 | Knop | ............... | D04H 1/4209 |
| | | | | 47/64 |
| 5,048,434 A * | 9/1991 | Forster | ............... | A01C 11/025 |
| | | | | 47/901 |
| 5,060,419 A * | 10/1991 | de Graaf | ............... | A01G 31/001 |
| | | | | 47/64 |
| 5,129,181 A * | 7/1992 | Kafka et al. | ............... | 47/64 |
| 5,207,733 A * | 5/1993 | Perrin | ............... | A01G 9/1086 |
| | | | | 47/64 |
| 5,218,783 A * | 6/1993 | Langezaal | ............... | A01G 9/104 |
| | | | | 47/64 |
| 5,401,281 A * | 3/1995 | Chamoulaud | ............... | A01G 31/00 |
| | | | | 47/56 |
| 5,605,012 A * | 2/1997 | Weder | ............... | A01G 5/04 |
| | | | | 47/41.12 |
| 6,029,399 A * | 2/2000 | Mercer | ............... | A01G 9/0295 |
| | | | | 47/66.5 |
| 6,176,037 B1 * | 1/2001 | Muramatsu | ............... | A01G 9/1086 |
| | | | | 47/64 |
| 6,389,748 B1 * | 5/2002 | De Groot et al. | ............... | 47/64 |
| 6,615,539 B1 | 9/2003 | Obonai et al. | | |
| 7,104,006 B1 * | 9/2006 | Blaakmeer et al. | ............... | 47/59 S |
| 2006/0123701 A1 * | 6/2006 | Lilly | ............... | A01C 1/04 |
| | | | | 47/57.6 |
| 2007/0000170 A1 * | 1/2007 | Hempenius | ............... | A01G 31/02 |
| | | | | 47/65.5 |
| 2009/0139140 A1 * | 6/2009 | Ammerlaan | ............... | 47/64 |
| 2009/0293350 A1 * | 12/2009 | Kania | ............... | A01G 9/02 |
| | | | | 47/20.1 |
| 2011/0146151 A1 * | 6/2011 | Janssen | | |
| 2013/0263508 A1 * | 10/2013 | Cuypers | ............... | A01G 24/18 |
| | | | | 47/59 S |

FOREIGN PATENT DOCUMENTS

| | | | | |
|---|---|---|---|---|
| EP | 252191 | | 1/1988 | |
| EP | 0520892 A1 * | | 12/1992 | ............ A01G 24/18 |
| EP | 823988 | | 2/1998 | |
| EP | 1889859 | | 2/2008 | |
| FR | 1537244 | | 8/1968 | |
| JP | 4267822 | | 9/1992 | |
| JP | H04267822 A | | 9/1992 | |
| WO | 9936368 | | 7/1999 | |
| WO | 2005004578 | | 1/2005 | |
| WO | 2008009467 | | 1/2008 | |
| WO | 2008-028923 | | 3/2008 | |
| WO | 2008089849 | | 7/2008 | |
| WO | 2010003677 | | 1/2010 | |

OTHER PUBLICATIONS

Max Yeilds, "Germinating and Planting Seeds," Feb. 27, 2003, http://www.hightimes.com/read/germinating-and-planting-seeds.*
Wikipedia, "Pencil," https://en.wikipedia.org/Wiki/Pencil.*
European Search Report, dated Aug. 20, 2014, 4 pages.
De Wilde et al., "*Cucumis sativus* L. Forma Hardwickii (Royale) W.J. de Wilde & Duyfjes and Fereal Froma Sativus" Thai for Bull. (BOT), vol. 38, 2010, pp. 98-107.
European Examination Report dated Feb. 20, 2017 for corresponding European Application No. 11738646.6.
European Oral Proceedings document corresponding to European Application No. 11 738 646.6 dated Feb. 25, 2019.

* cited by examiner

GROWTH SUBSTRATE PRODUCT FORMED OF MINERAL WOOL

FIELD OF THE INVENTION

The present invention relates to methods of propagation of seeds and to products for use in such methods and to processes of making these products.

BACKGROUND OF THE INVENTION

The first stage of commercial growing of plants based on seeds is the propagation stage. It has been well known for many years to propagate seeds for fruit and vegetable and other crops in growth substrates formed from mineral wool. Usual practice is to position a seed in a small-volume growth substrate, which can be formed of mineral wool or other synthetic materials, in a cut-out at the top surface of the growth substrate. Once the plants have rooted and developed leaves in a first growth substrate they can then be transferred to the next growth stage, usually to another growth substrate of greater volume, either in the same facility or in another facility.

Propagation of seeds has conventionally been done for many years in a growth substrate which is relatively small in volume (usually described as a plug). It is also known, from our International Patent Publication WO2010/003677, to propagate seeds in a growth substrate of larger volume, up to 150 cm$^3$.

It is the aim and the responsibility of the propagator to ensure rapid but strong and uniform growth of the seeds into seedlings and to ensure that the resulting seedlings have characteristics most appropriate for eventual strong growth into the final plants, optionally after transfer to a different facility and/or to another growth substrate. The optimum result for the propagator is that all seeds result in plants and all plants are of the highest quality.

One difficulty which arises is that of ensuring that all climatic conditions and the levels of water and oxygen supplied to the seed during the propagation stage are appropriate to obtain optimal properties of the seedlings. For instance, the seed needs contact with sufficient water to enable rapid and effective development of the first pin root and shoot, and rooting-in; however, if the growth substrate has too high a water content then the oxygen content tends to be too low. This results in roots which are too long and insufficiently strong. The result of the propagation stage should be a compact net of roots, but a low oxygen content can lead to a root net which is insufficiently compact. Ideally, for instance, a propagator would want a water content in the growth substrate of around 75% but in practice it is closer to 100%. This too-high water content leads to lower germination rates and lower plant quality. As a result, there is a tendency for propagators to water the growth substrates less often than might be desirable for rooting-in purposes.

For many years, despite these difficulties, propagators have worked with mineral wool plugs in the manner described above, and have more recently worked with the system described in our publication WO2010/003677 and have used their skill and knowledge as propagators to manage the conditions and obtain the best possible growth under the circumstances.

However, it would be desirable to be able to provide a growth substrate which enables stronger but nevertheless rapid growth leading to a resultant seedling which has optimised properties for later growth, including for instance a compact root net. The propagator also aims for the maximum possible germination ratio and for uniformity of the resultant plants.

It is also standard to position a seed in a cut-out (seed hole) in a growth substrate and cover the seed with vermiculite (or, rarely, another particulate material such as coco). The cut-out is commonly conical or frustoconical. The purpose of this is to maintain the seed in place (at the point of the cone) and to ensure retention of adequate moisture around the seed as it germinates.

However, the use of vermiculite leads to problems due to the fact that it is present in the form of small particles. It tends to contaminate irrigation systems and has the potential to block pipes and filters. It can also contaminate the automated equipment used for positioning seeds in the growth substrates, selecting machines for seeding and fully automated grafting machines.

Despite this, growers have, for many years, as standard practice, used vermiculite as a covering for the seeds due to its highly important function of ensuring sufficient moisture retention.

It is known to propagate seeds in other growth substrates than mineral wool growth substrates.

For instance in DK 102550, a growth substrate block for plant cultivation made from sponge-like, natural or artificial material is provided which has an incision or a crack into which seeds, seedlings, shoots or the like are inserted and wedged in position with the help of the natural elasticity of the two parts adjacent the incision. Materials for the growth substrate mentioned in the description are porous plastic material, peat possibly mixed with wood pulp, the materials being soaked in a mix of soil, clay, nutrients and water. The incision is positioned such that it is parallel to the ground when the growth substrate product is in use.

EP-A-252191 relates to a synthetic substrate such as polyurethane foam for use in the rooting of cuttings and seedlings. The synthetic substrate is a dual-density product characterised by having at least one region of relatively low capillarity, which is intended for receiving a cutting or seedling to be propagated, and at least one region of relatively high density, which exhibits higher capillarity than the said low density region. The low density region may contain one or more blind bores for receiving cuttings or seedlings. This document does not discuss the use of mineral wool growth substrates.

SUMMARY OF THE INVENTION

According to a first aspect of the invention we provide a coherent growth substrate product formed of mineral wool, the product having two opposed top and bottom surfaces and a seed hole extending from the top surface towards the bottom surface, the base of the seed hole defining a seed bed, wherein the volume of the growth substrate product is not more than 150 cm$^3$, and wherein the seed bed has a width of at least 5 mm.

Thus, in the invention, the growth substrate product, which is especially useful as a substrate for the propagation phase, has a seed hole with a seed bed whose width is at least 5 mm. This is significantly different in form from standard propagation growth substrates (plugs), whose seed holes are much narrower at their minimum width (the width being the measurement parallel to the top surface and therefore horizontal when the product is in use). Thus, in a standard plug with a conical seed hole there is no seed bed—the minimum width is essentially zero as it is the point of the cone. Even in a known frustoconical form seed hole the flat base of the seed hole is narrow, well below 5 mm in width, and thus does not have a seed bed of width at least 5 mm.

A key benefit of this seed hole configuration is that it enables the correct balance of water and oxygen for the seed. In fact the free space around the seed that is present as a result of the broad seed bed enables the root and sprout to find their way into the growing direction without resistance; namely the roots point downwards and the sprouts point upwards. The stem therefore grows straight upwards and is centred in the plug. The ability of any seed to do this without resistance from the growth substrate material is highly important, as it enables all seeds (in a single sown batch) to develop uniformly. For instance, if a seed lies upside down and undergoes any kind of resistance from growth substrate material or vermiculite, it will cost the seedling a lot of effort for the root and sprout to point in the right direction. This results in a delay in growth, causing non-uniformity between seedlings. The invention avoids such delays and allows uniform growth.

As a result, we find that the growth substrate allows better uniformity of initial growth, due to greater freedom for the roots in the early development stage. For instance, development of the first pin root is easier. In particular lateral root growth is improved which means that the plant is more securely anchored in the plug. Further, germination occurs deeper in the plug. The increased lateral roots and the deeper germination means that when the plug is grafted, the plant is more secure in the plug. We also find that seeds can develop from germination to seedling more rapidly.

We also find that this product enables the grower to obtain, more easily than with prior art products, adequately high oxygen levels for the seed even when frequent watering is used, without water-logging the growth substrate. This leads to numerous benefits including an improved pattern of root growth and a compact root net and ultimately stronger plants achieved at the end of the growing period. The germination ratio is increased and the uniformity of the resultant plants is improved.

In particular, we find that a major advantage of this product is that adequate moisture can be provided to the seed, and it can be retained stably in the seed hole, without the need for vermiculite (or other particulate covering material) to be added on top of the seed.

The absence of vermiculite also contributes to the improved oxygen supply to the seed, already improved as a result of the defined minimum width of the seed hole.

According to a second aspect of the invention we provide a method of propagation of seeds comprising providing a product in accordance with the first aspect of the invention, positioning a seed in the seed hole of the growth substrate product, on the seed bed, irrigating the growth substrate product and allowing germination and growth of the seed to form a seedling.

The growth substrate product of the first aspect of the invention can be made in various ways, including the process of the third aspect of the invention, which comprises providing a coherent mass of mineral wool having volume not more than 150 cm$^3$ and opposed top and bottom surfaces and forming in the mass of mineral wool a seed hole extending from the top surface towards the bottom surface, the base of the seed hole defining a seed bed having a width of at least 5 mm, wherein the seed hole is formed by punching.

Thus, in the method of the third aspect of the invention the seed hole is created not by removal of material (e.g. milling, drilling) but by moving and compression of material. An advantage of the process of the third aspect of the invention is that the punching step, which moves and compresses material to form the seed hole, results in generation of a region of relatively high density around the seed hole. This has advantages in ensuring that there is concentration of water in the part of the growth substrate which is close to or in contact with the seed, which encourages improved rooting-in. This can be achieved without excessively high water content in the remainder of the growth substrate product and hence without negative effects on the oxygen content of the growth substrate product.

The growth substrate product of the invention is formed of mineral wool. The mineral wool can be of the conventional type used for formation of known mineral wool growth substrates. It can be glass wool or slag wool but is usually stone wool. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general it can be any of the types of man-made vitreous fibre which are conventionally known for production of growth substrates. Fibre diameter is often in the range of 3 to 20 microns, in particular 5 to 10 microns, as conventional.

The growth substrate is in the form of a coherent mass. That is, the growth substrate is generally a coherent matrix of mineral wool fibres, which has been produced as such, but can also be formed by granulating a slab of mineral wool and consolidating the granulated material.

The mineral wool growth substrate usually comprises a binder, often an organic binder, which is generally heat-curable. The growth substrate is preferably a coherent matrix of mineral fibres connected by cured binder. The binder can be an organic hydrophobic binder, and in particular it can be a conventional heat-curable (thermosetting), hydrophobic binder of the type which has been used for many years in mineral wool growth substrates (and other mineral wool-based products). This has the advantage of convenience and economy. Thus, the binder is preferably a phenol formaldehyde resin or urea formaldehyde resin, in particular phenol urea formaldehyde (PUF) resin. The binder can be itself hydrophilic, for instance as described in EP1889859A. It can be a formaldehyde-free binder, such as in WO2008/028923 or EP1047645A, or phenol-free, as in WO2008/089849.

The binder is generally present in the mineral wool growth substrate in amounts of from 0.1 to 10% based on the substrate, usually 0.5 to 7%, most preferably 1.5 to 5%.

In the case where the binder itself is hydrophilic then wetting agent is not normally used, but in cases where the binder is not hydrophilic the mineral wool growth substrate preferably also comprises a wetting agent. This can be a conventional wetting agent such as a non-ionic surfactant. Alternatively it can be an ionic surfactant, preferably an anionic surfactant. For instance it can be any of the ionic surfactants described in our publication WO2008/009467.

The wetting agent is present in the growth substrate in amounts of preferably from 0.1 to 3% (by weight), based on growth substrate, more preferably 0.05 to 1%, in particular, 0.075 to 0.5%.

Preferably the amount (by weight) of wetting agent based on the weight of binder (dry matter) is in the range 0.01 to 5%, preferably 0.5 to 4%.

The mineral wool growth substrate may contain other types of conventional additives in addition to binder and wetting agents, for instance salts such as ammonium sulphate and adhesion promoters such as silanes.

Preferably the fibres are arranged predominantly in the vertical direction. This has the advantage of allowing better root growth than other orientations and enables the provision of a robust substrate which is useful during transplantation to the next stage.

The mineral wool growth substrate product may have dimensions conventional for the product type commonly known as a plug. Thus it may have height from 20 to 35 mm, often 25 to 28 mm, and length and width in the range 15 to 25 mm, often around 20 mm. In this case the substrate is often substantially cylindrical with the end surfaces of the cylinder forming the top and bottom surfaces of the growth substrate. Another embodiment has height from 30 to 50 mm, often around 40 mm and length and width in the range 20 to 40 mm, often around 30 mm. The growth substrate in this case is often of cuboid form. In this first case the volume of the growth substrate is often not more than 50 $cm^3$, preferably not more than 40 $cm^3$. Alternatively the growth substrate may be of the type described as the first coherent mineral wool growth substrate in our publication WO2010/003677. In this second case the volume of the growth substrate product is most preferably in the range to 10 to 40 $cm^3$.

The height is the vertical height of the growth substrate when positioned as intended to be used.

In general, the growth substrate may be of any appropriate shape including cylindrical, cuboidal and cubic.

In general the volume of the growth substrate product is in the range 5 to 150 $cm^3$ and preferably not more than 100 $cm^3$, more preferably not more than 80 $cm^3$, in particular not more than 75 $cm^3$, most preferably not more than 70 $cm^3$.

The minimum distance between the top and bottom surfaces is preferably 50 mm, more preferably less than 40 mm and in particular less than 30 mm.

A single mineral wool growth substrate product will usually contain a single seed hole. Alternatively, a product may be provided which contains multiple seed holes, usually substantially identical in their form. A product of this sort may be used for propagation of multiple seeds. Alternatively, a product may be provided which is an array of connected mineral wool growth substrate products of the invention, connected for instance by grooves so that it is possible to break off one or more growth substrate products, each containing a single seed hole, either by hand or using some sort of blade or other suitable equipment.

Another form of product is an array of mineral wool growth substrates according to the invention, connected by means of a film or sheet extending across and connected to the top surfaces of the growth substrate products. The film or sheet may be formed of any appropriate material, including polymeric materials such as biodegradable plastic, but paper is preferred. The covering sheet should be chosen so that it does not prevent the product taking up water during initial wetting. It may be impermeable or may be porous, provided that the pores have diameter less than the width of the seed.

Usually the film or sheet is attached to the top surfaces of the growth substrate products using adhesive.

The covering film or sheet can protect and contain the seed within the seed hole in each growth substrate product.

One benefit of such an array is that it can be provided to a propagator in dry form but already filled with seeds so that the propagator does not have to undertake the time-consuming process of applying the seeds to the growth substrate products. The propagator needs only to undertake the wetting step to start the growth process. Furthermore, the covering sheet or film acts to connect the growth substrate products, allowing the propagator to dispense with a tray or other carrier. In some cases it can be preferred for the array to be provided with a second layer of the film or sheet (of the same type or a different type to that provided as the covering layer) along the bottom surfaces of the growth substrate products.

In such a case it is particularly advantageous for the growth substrates already to contain growth promoting chemicals such as hormones and/or pesticides and/or fertiliser and/or root stimulator. Alternatively or additionally, further growth promoting materials can be included together with the seed, for instance as a separate pellet placed under the covering sheet with the seed.

Such an array can be produced as follows: Such an array can be produced as follows:
1. Production of growth substrate material in coherent form.
2. Shaping of the growth substrate material into the form of the product having the required dimensions.
3. Forming a seed hole in the top surface.
4. Positioning a seed in each seed hole.
5. Positioning a covering sheet over the array and adhering it to the top surfaces of the growth substrates.

Generally the seed hole is positioned substantially centrally within the product. Its configuration is preferably such that the sides of the seed hole are essentially parallel and is therefore generally cylindrical. Alternatively it may be frustoconical, usually with the base of the cone being the opening point at the top surface. However in this case it is also possible for the narrower end to be at the top surface.

The seed hole has walls extending down from the top surface of the growth substrate towards the bottom surface, to the seed bed. The seed bed is thus the zone defined by the base of the seed hole, surrounded by the lower parts of the side walls of the seed hole. This seed bed is thus configured for receiving a seed and the seed can rest on it. It is essential that the width of the seed bed at the base of the seed hole is at least 5 mm (width being the distance between the side walls at the point where they meet the base of the seed hole). Preferably the width is at least 6 mm. Preferably it is not more than 10 mm, in particular not more than 7 mm. The most preferred width is in the range 6 to 7 mm.

The seed bed can be a cone, usually a shallow cone, or can be generally concave but is preferably substantially flat. Thus its depth is usually not more than 2 mm, usually not more than 1 mm.

The seed bed is often substantially circular or elliptical.

The walls of the seed hole may at some point be closer together than they are at the point where they join the seed bed, provided that it is possible easily to introduce a seed onto the seed bed (e.g. at least 3 mm width of the seed hole at all depths) and provided that the seed has the clearance for initial growth discussed above as advantage resulting from the configuration of the product of the first aspect of the invention. However, it is highly preferred that at no point is the seed hole narrower than the width of the seed bed.

It is highly preferred that the depth of the seed hole is at least 7 mm, and more preferably at least 9 mm. Preferably it is not more than 15 mm, and in particular not more than 12 mm. The preferred minimum depth contributes to the advantages discussed above in connection with the minimum width. In particular the minimum depth contributes to allowing the absence of vermiculite (or other particulate covering).

The seed hole preferably has a volume in the range 4 to 35% of the total volume of the growth substrate product, in particular in the range 5 to 20% of the total volume, especially 6 to 17%.

Preferably the bottom surface of the growth substrate is substantially flat so that it can stand on a flat surface during the growing method.

The average density of the product as a whole is in the range 60 to 100 kg/m$^3$, preferably 70 to 85 kg/m$^3$, preferably more than 55 kg/m$^3$, preferably not more than 95 kg/m$^3$, preferably not more than 90 kg/m$^3$.

The average density of the product as a whole is preferably at least 55 kg/m$^3$, preferably at least 60 kg/m$^3$, preferably at least 70 kg/m$^3$ to allow the product to be mechanically handled by the propagator with minimal loss for damaged products. The average density of the product as a whole is preferably less than 100 kg/m$^3$, preferably less than 95 kg/m$^3$, preferably less than 90 kg/m$^3$, preferably less than 85 kg/m$^3$, to allow plant roots to penetrate the product.

In preferred embodiments there is a region surrounding the seed hole which has higher density than the remainder of the growth substrate product. This region preferably extends at least 0.5 mm, preferably at least 1 mm, from the surface at the seed hole, but generally not more than 2 mm. The density of this densified region is preferably at least 5%, more preferably at least 10%, greater than the average density of the product as a whole. Most preferably it is in the range of 10 to 15% greater than the average density of the product as a whole.

This particular feature contributes to improvement of the water supply directly to the seed. It is believed that this is because the seed is in contact with the region of higher density which can have higher water content than the remainder of the growth substrate without causing saturation of the remainder of the growth substrate.

The growth substrate product of the first aspect of the invention is for use in a method of propagation. This is as defined above in connection with the second aspect of the invention.

According to this method the growth substrate is preferably watered, by soaking or by the use of wetting lines (or any other conventional wetting-up method), after which the seed is positioned in the growth substrate on the seed bed.

Positioning of the seed can be done in conventional manner. Accurate positioning is important and a preferred method is with the use of a seeder apparatus such as the Granette nozzle seeder (available from Visser).

The Granette seeder is a nozzle seeder with self-cleaning nozzles, which sows direct into the cell of the tray. Because of the many possible adjustments at the seeder in combination with the PSL-II index belt a very high accuracy is possible. The seeder has a double nozzle bar for sowing two rows of cells in a tray in one stroke. The vibrating nozzle bar will be positioned above the vibrating seed hopper, where the seeds will be picked up. By adjusting the time for picking up the seed, the amount of vacuum and the vibration intensity of the seed hopper and nozzle bar the desired result can be achieved. After picking up the seeds, the nozzle bar will be above the positioned tray, where the vacuum at the nozzles will be released so the seeds will drop into the centre of the cells of the tray. After dropping the seed, as the nozzle bar returns to the seed hopper, the nozzles are cleaned out by needles that come out of the nozzle-ends.

A seed is usually up to 4 mm, generally up to 3 mm in length. Pelleted seeds (pelleted within clay, optionally including pesticides or other additives) are usually of length 2.5 to 3.5 mm, often around 3 mm. Non-pelleted (naked) seeds can be any size up to 3 mm. Therefore the seed will easily fall to the base of the seed hole in the growth substrate.

After the seed has been positioned it can be covered with vermiculite, as conventional. However, an advantage of the invention is that vermiculite is not needed and therefore is preferably not used. Vermiculite is essentially the only particulate covering material used in standard practice in propagation, but in the invention it is also preferred not to use any particulate covering material.

The seed is then allowed to root and grow in standard manner, normally for at least 2 days, often for at least 8 days and, depending upon the plant type, at least 10 days, and in some cases at least 14 or at least 16 days.

In the case of using the seedlings for grafting, the root stock is taken after up to 16 days and grafted. The grated plant is then grown for a further 22 to 30 days to have a plant ready for the next growth stage.

The propagation method can be conventional or can be as described in our publication WO2010/003677.

After the propagation stage the seedling produced can be transferred, in the mineral wool growth substrate, to a further growth substrate to allow further growth to the final plant in conventional manner.

The plant can be any of the types conventionally grown from seed, including tomato, cucumber, sweet pepper and egg plant.

In the method of the second aspect of the invention, the mineral wool growth substrate product may have any of the preferred features discussed above in connection with the product of the first aspect of the invention.

A particular advantage of the propagation method of the invention is that it generates an improved root distribution in the eventual seedling. Accordingly, the invention also provides the use of a product of the first aspect of the invention in a method of propagation to improve the root distribution, especially in comparison with standard mineral wool growth substrates for propagation which do not have a seed bed of width at least 5 mm.

The product of the first aspect of the invention can be made in any convenient manner. In general the product is generated using any of the known means for producing a growth substrate of the type used for propagation, to form a product without a seed hole. The seed hole can be generated by any suitable means, for instance by cutting or drilling or milling. However, we find that particularly desirable results are achieved when the seed hole is generated by punching, namely a method which does not result in removal of material from the product but instead displaces material.

Thus, a preferred method of producing the product of the first aspect of the invention is by means of a method as defined in the third aspect of the invention.

According to this method a coherent mass of mineral wool is provided having appropriate characteristics for use as the growth substrate product and the required seed hole is generated in the coherent mass by punching. Forming the seed hole by punching (rather than some other means such as cutting or drilling which removes material from the coherent mass of mineral fibres) has the effect of compressing the mineral wool at the surface of the seed hole and increasing its density. We believe that this results in a structure which ensures that adequate water is always directed to the surface of the seed hole and hence close to the seed which is in contact with the surface of the seed hole.

The punching equipment would normally have a pointed end, and could have different shapes, e.g. mandrel-like. The punching equipment could for instance have a width corresponding to the width of the desired channel. When making the channel in a growth substrate product, the punching equipment will be forced into the relevant surface of the growth substrate product and thereby displace the mineral wool outwardly. This way the displaced material will create a higher density in the growth substrate product surrounding the seed hole than for the rest of the growth substrate product.

BRIEF DESCRIPTION OF THE DRAWINGS

Following hereinafter are a number of drawings, with reference to which the mineral wool growth substrate product and process of making the same according to the invention are further illustrated.

DETAILED DESCRIPTION OF THE INVENTION

Figure 1A:
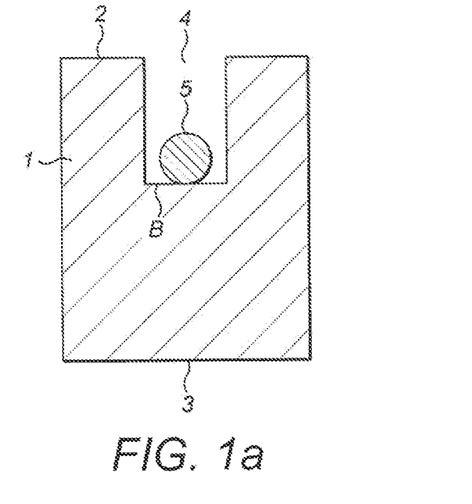
FIGS. 1a to 1c are schematic, cross sectional views of embodiments of the mineral wool product provided with a cylindrical seed hole.
Figure 1B:
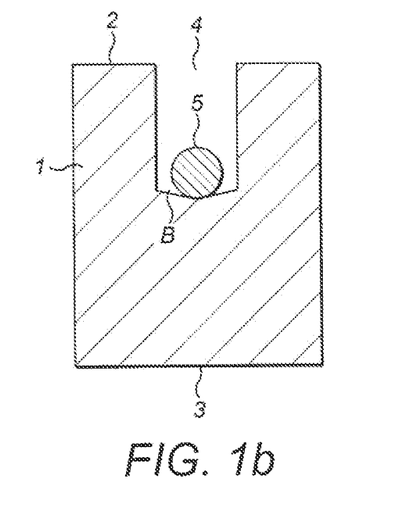
Figure 1C:
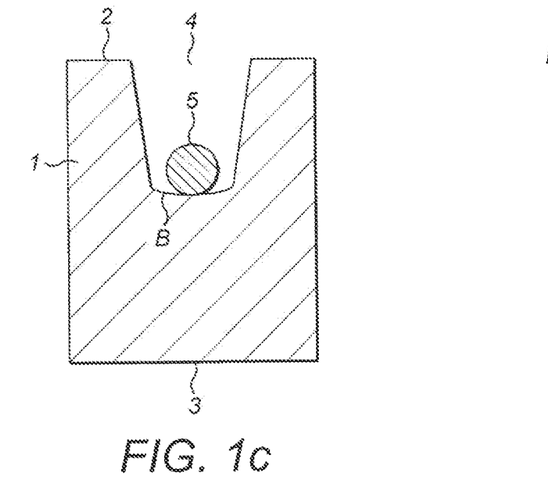

In the accompanying drawings, FIGS. 1a to 1c each show a cross section of a preferred growth substrate for use in the invention.

In FIG. 1 a the growth substrate 1 has a top surface 2 and a bottom surface 3. A substantially cylindrical seed hole 4 extends from the top surface 2 towards the bottom surface 3, to a seed bed B formed by the base of the seed hole. In this embodiment the seed bed B is flat and has width 6 mm.

In this embodiment the growth substrate is generally cylindrical with a diameter of 20 mm and a height of 25 mm with the diameter of the seed hole 4 being 6 mm at all depths and its depth being 10 mm.

Figure 4:
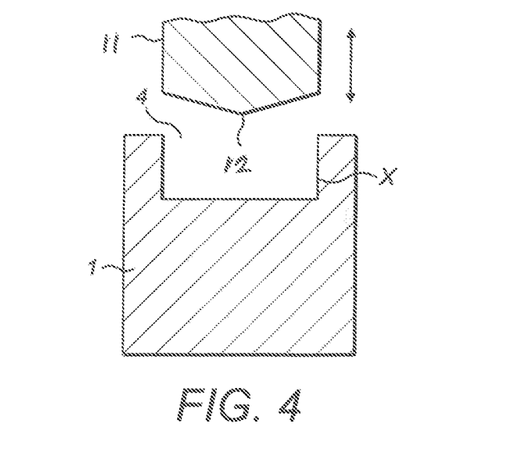
FIG. 4 is a schematic, cross sectional view of a seed hole and the punching equipment being used to illustrate the process of making the seed hole.

In use a seed 5 is positioned inside the seed hole 4. The seed hole has been formed by punching, as illustrated in FIG. 4, and so there is a region X surrounding the seed hole, having density higher than the average overall density of the growth substrate.

FIG. 1 b is similar except that the seed bed B is in the form of a shallow cone and has depth 1 mm. The width of the seed bed is the same as in FIG. 1a, namely 6 mm.

FIG. 1b is similar except that the seed bed B is in the form of a shallow concave dip and has depth 1 mm. The width of the seed bed is the same as in FIG. 1a, namely 6 mm. Additionally, the seed hole is frustoconical rather than cylindrical, with the width at all depths being more than 6 mm. A frustoconical seed hole could of course be combined with a seed bed B having the configuration in FIG. 1a or 1b.

In the invention rapid, strong and uniform growth is obtained due to the configuration of the seed hole leading to an optimal balance of water and oxygen for the seed and to optimum free space allowing the seeds to germinate freely.

Figure 2:
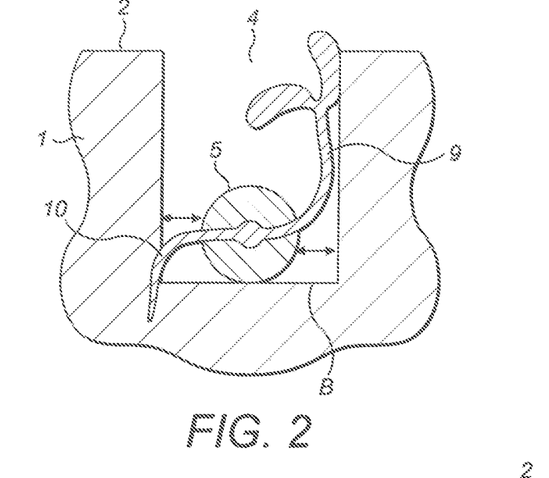
FIG. 2 is a schematic, cross sectional view of a seed hole including a germinated seed.

FIG. 2 shows a view of the seed hole 4 in a growth substrate 1 with a top surface 2, after a seed 6 has germinated and the first root 10 has developed. This demonstrates the free space available to the seed for root growth.

The free space enables the root 10 and sprout 9 to find their way into the growing direction without resistance so the root 10 will point downwards and the sprout 9 will point upwards. This way the seed will anchor better and develop in a uniform manner.

Figure 3:
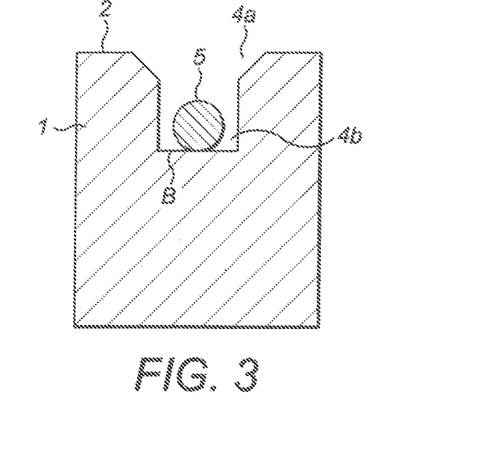
FIG. 3 is a schematic, cross sectional view of the mineral wool product provided with a differently shaped seed hole.

FIG. 3 shows a cross-section of a different embodiment of the growth substrate product 1 having a differently shaped seed hole 4. In this case the upper part 4a is substantially frustoconical and the lower part 4b is substantially cylindrical in shape. The seed bed B is cylindrical. As with the embodiments of FIGS. 1a to 1c, the width of the seed hole at its narrowest point is 6 mm. At its widest point the width is greater.

FIG. 4 illustrates schematically the production of a growth substrate product 1 using a punching method. According to this a punching tool or spine 11 is used to form the seed hole 4 including the seed bed B by being pressed vertically into the top surface of the growth substrate. The punching tool 11 has one pointed end 12. Since the seed hole is formed without removal of material, a compressed region at the surface of the seed hole is formed, designated as shaded area X in FIG. 4. This compressed region X of the seed hole provides higher density of the growth substrate surrounding the seed hole 4 and thereby ensures a concentration of water in the part of the growth substrate which is close to or in contact with the seed, which encourages improved rooting-in.

Figure 5:
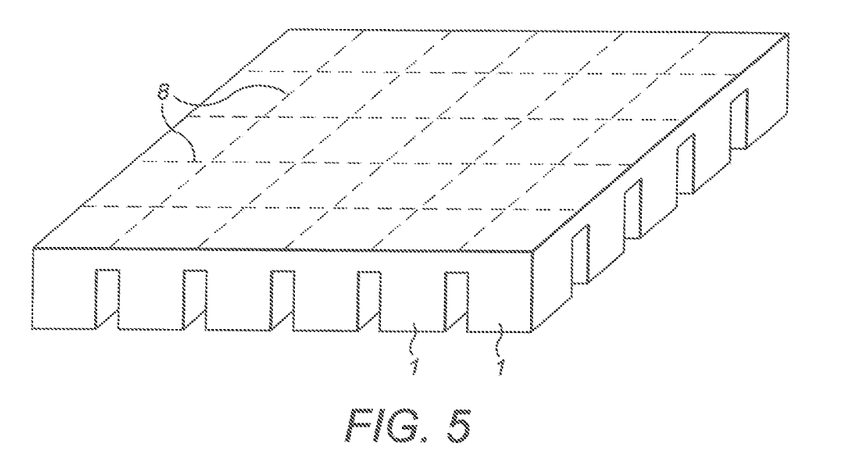
FIG. 5 is a schematic, perspective view of an array of growth substrate products.

FIG. 5 illustrates a product which is a joined array of growth substrate products 1. In this case they are formed as an integral array formed of mineral wool. In this Figure the seed holes are not illustrated. When it is required to use the products 1 then they can be broken from the array along the broken lines 8.

Figure 6:
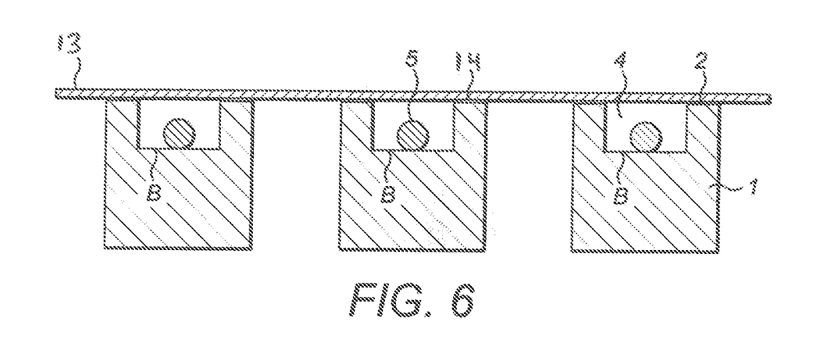
FIG. 6 is a schematic, cross sectional view of an array of growth substrate products provided with seeds.

FIG. 6 shows a cross-sectional view of an array of separate growth substrate products 1, each having a seed hole at the top surface 3 of the product in which a seed 3 is positioned. The products 1 are not integrally formed but are joined by a sheet 13 which is attached to the top surfaces 2 of the product 1 using adhesive 14. Preferably the sheet is of paper. This way the propagator does not have to undertake the time-consuming process of applying the seeds to the growth substrate products. Furthermore, the sheet 13 connecting the growth substrate products 1 allows the propagator to dispense with a tray or other carrier.

The invention claimed is:

1. A coherent growth substrate product formed of mineral wool, the product having a top surface opposed from a bottom surface and a seed hole extending from the top surface towards the bottom surface, the base of the seed hole defining a seed bed, wherein the volume of the growth substrate product is not more than 150 cm$^3$, wherein the seed bed has a width in the range of 5 mm to 10 mm and a depth in the range of 7 mm to 15 mm, wherein the density of the mineral wool immediately surrounding the seed hole is greater than the density of the remainder of the mineral wool forming the growth substrate product, wherein the density of the growth substrate product is 70-85 kg/m$^3$, and wherein the seed bed is generally circular or generally elliptical and wherein the base of the seed bed is substantially flat.

2. A growth substrate product according to claim 1 in which the seed bed has a width at least 6 mm.

3. A growth substrate product according to claim 1 in which the seed bed has a width at its narrowest point of not more than 8 mm.

4. A growth substrate product according to claim 1 in which the seed hole has a depth at least 9 mm.

5. A growth substrate product according to claim 1 in which the seed hole has a depth not more than 15 mm.

6. A growth substrate product according to claim 1 in which the seed hole is generally cylindrical or generally frustoconical.

7. A growth substrate according to claim 1 comprising at least one wetting agent.

8. A method for forming a seedling, comprising:
providing, during a propagation stage of a commercial plant growing operation, a growth substrate product according to claim 1;
positioning the product such that the top surface is uppermost;
positioning a seed on the seed bed of the product;
irrigating the growth substrate product; and
allowing germination and growth of the seed to form a seedling.

9. A method according to claim 8 in which the seed bed has a width at least 6 mm.

10. A method according to claim 8 in which no particulate covering material is applied on top of the seed on the seed bed.

11. A method according to claim 8 wherein the seed is positioned in the seed hole using a nozzle seeder.

12. A process of making a growth substrate product as defined in claim 1 comprising providing a coherent mass of mineral wool having volume not more than 150 cm$^3$ and opposed top and bottom surfaces and forming in the mass of mineral wool a seed hole extending from the top surface towards the bottom surface, and having a base defining a seed bed, the seed bed having a width at of at least 5 mm, wherein the seed hole is formed by punching.

13. A process according to claim 12 in which the seed bed has a width at least 6 mm.

14. A growth substrate product according to claim 1 in which the seed bed has a width at its narrowest point of not more than 7 mm.

15. A growth substrate product according to claim 1 in which the seed hole has a depth not more than 12 mm.

16. A growth substrate product according to claim 1 in which a seed is located in the seed hole and a film or sheet extends across, and is connected to, the top surface of the product so as to cover the seed hole.

17. A growth substrate product according to claim 1 further comprising: a seed located in the seed bed; and wherein the top of the seed bed is free of a particulate covering.

18. A growth substrate product according to claim 1, wherein the growth substrate product comprises a binder and a wetting agent, the wetting agent being present in an amount (by weight) of 0.01 to 5% based on the weight of the binder, wherein the coherent growth substrate product is adapted for use in a commercial plant growing operation.

* * * * *